(12) United States Patent
Watanabe

(10) Patent No.: US 9,854,169 B2
(45) Date of Patent: Dec. 26, 2017

(54) IMAGE PROCESSING APPARATUS, IMAGE PICKUP APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Takeshi Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 14/722,637

(22) Filed: May 27, 2015

(65) Prior Publication Data

US 2015/0358544 A1  Dec. 10, 2015

(30) Foreign Application Priority Data

Jun. 6, 2014  (JP) ................. 2014-117484

(51) Int. Cl.
| | | |
|---|---|---|
| H04N 5/232 | (2006.01) | |
| H04N 5/357 | (2011.01) | |
| G06T 5/00 | (2006.01) | |
| G06T 5/10 | (2006.01) | |

(52) U.S. Cl.
CPC ......... *H04N 5/23267* (2013.01); *G06T 5/003* (2013.01); *G06T 5/10* (2013.01); *H04N 5/3572* (2013.01); *G06T 2207/20056* (2013.01); *G06T 2207/20201* (2013.01)

(58) Field of Classification Search
CPC .......... H04N 5/23251; H04N 5/23264; H04N 5/23267; H04N 5/3572
See application file for complete search history.

(56) References Cited

U.S. PATENT DOCUMENTS

| 5,790,709 A | * 8/1998 | Kopeika ............ H04N 5/23248 348/342 |
|---|---|---|
| 8,537,225 B2 | 9/2013 | Obu |
| 8,848,063 B2 | 9/2014 | Jo et al. |
| 2010/0079615 A1 | * 4/2010 | Hatakeyama ............ G06T 5/20 348/223.1 |

FOREIGN PATENT DOCUMENTS

| JP | 2004239962 A | 8/2004 |
|---|---|---|
| JP | 2005252760 A | 9/2005 |
| JP | 2008099025 A | 4/2008 |
| JP | 2010258570 A | 11/2010 |
| JP | 2012234393 A | 11/2012 |

* cited by examiner

*Primary Examiner* — Daniel M Pasiewicz
(74) *Attorney, Agent, or Firm* — Rossi, Kimms & McDowell LLP

(57) ABSTRACT

An image processing apparatus includes a determination unit configured to determine an optical transfer function based on shooting condition information, an acquisition unit configured to acquire shake information, a control unit configured to select a method of image restoration based on the optical transfer function and the shake information, and an image restoration unit configured to perform the image restoration based on the selected method of the image restoration.

17 Claims, 11 Drawing Sheets

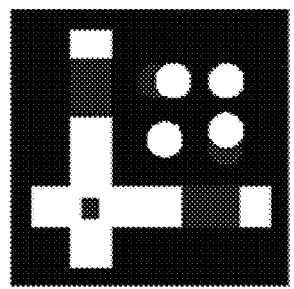
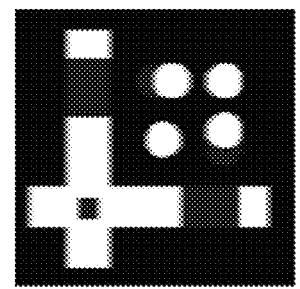
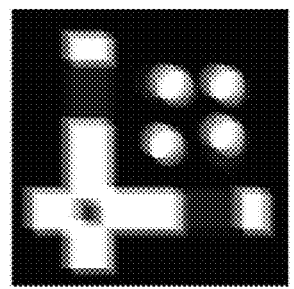
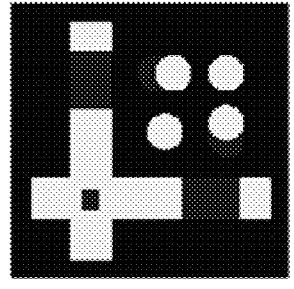
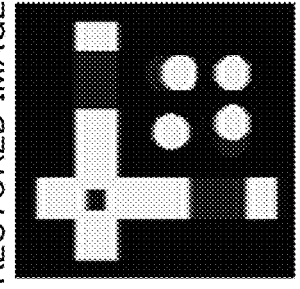
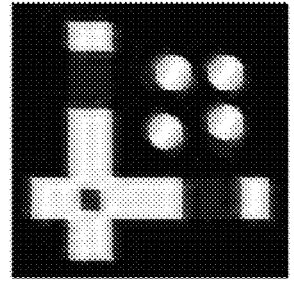
FIG. 5A  FIG. 5B  FIG. 5C

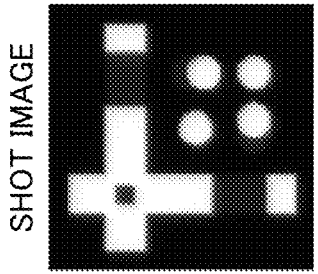 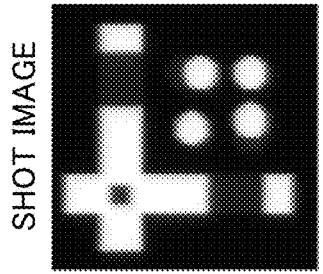 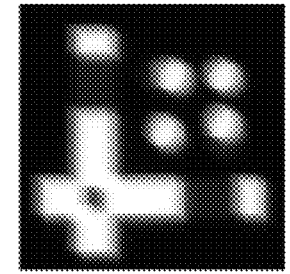
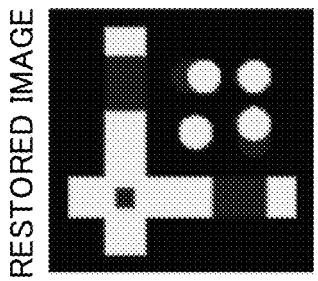 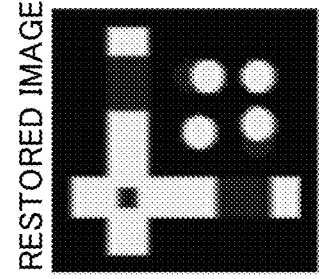 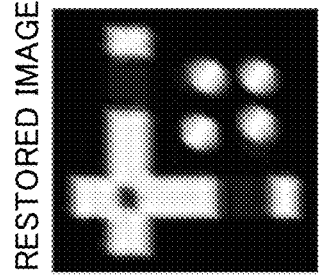
FIG. 7A  FIG. 7B  FIG. 7C
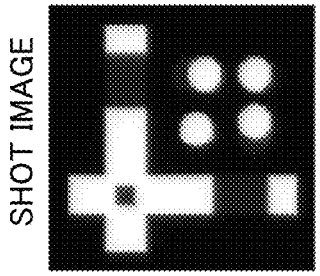 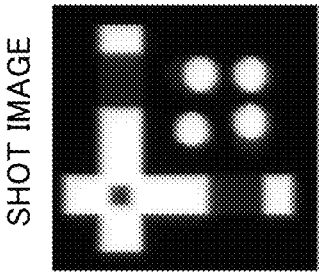 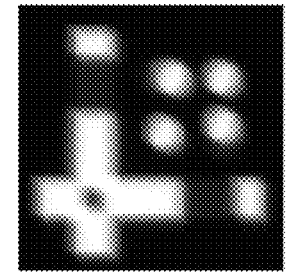
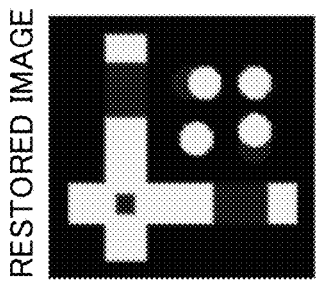 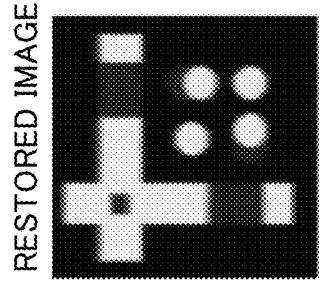 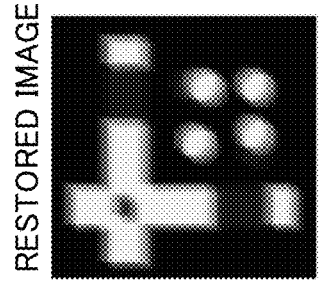
FIG. 8A  FIG. 8B  FIG. 8C

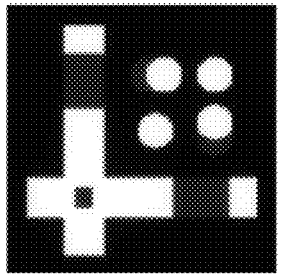
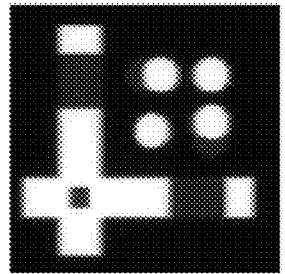
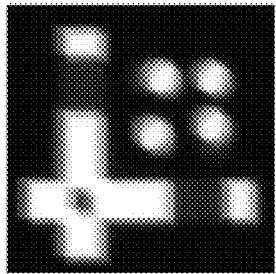
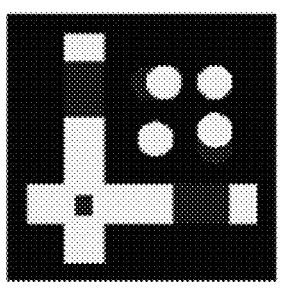
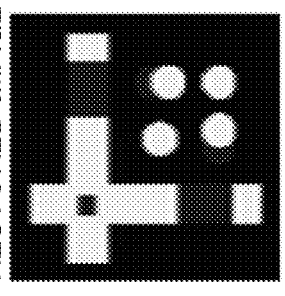
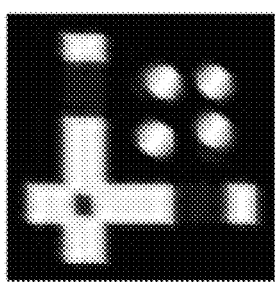
FIG. 10A     FIG. 10B     FIG. 10C
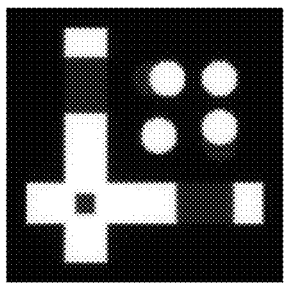
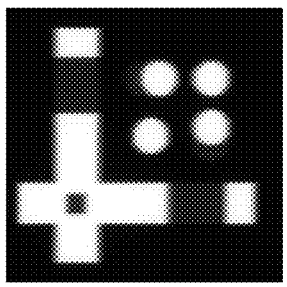
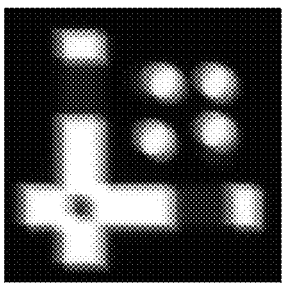
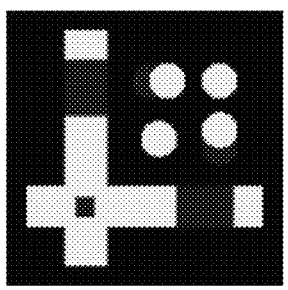
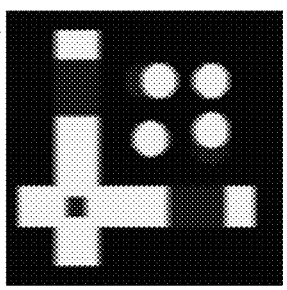
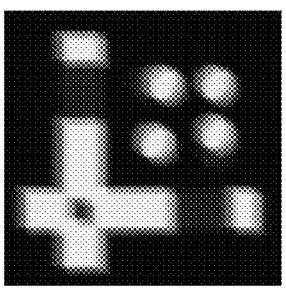
FIG. 11A     FIG. 11B     FIG. 11C

IMAGE PROCESSING APPARATUS, IMAGE PICKUP APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus which performs image restoration.

Description of the Related Art

For an object shot via an image pickup optical system, light emitted from one point cannot be converged to another point and has a minute spread due to an influence of a diffraction, an aberration, or the like that occurs in the image pickup optical system. Such a minutely-spread distribution is referred to as a point spread function (PSF). Due to the influence of the image pickup optical system, the shot image is formed with the PSF convoluted with the image, and accordingly, the image is blurred and its resolution is deteriorated.

Recently, the shot image is typically stored as electronic data, and image restoration has been proposed which corrects an image deterioration caused by an optical system by performing image processing. For example the image restoration using the Wiener filter is known. The image deterioration caused by a shake (image blur caused by a hand shake) can occur at the time of shooting an image. Even when an image pickup apparatus including an image stabilizer is used, image stabilization (image blur correction) cannot be effectively achieved in some cases if an amount of the shake is increased.

Japanese Patent Laid-open No. 2004-239962 discloses an image pickup apparatus which switches restoration processing according to whether or not an image blur correction optical system is driven. Japanese Patent Laid-open No. 2005-252760 discloses an image pickup apparatus which performs restoration processing considering an error of a control position at which an image blur correction optical system is driven.

However, a blurred image (shot image) contains a plurality of points where an optical transfer function (OTF) becomes zero, and thus it is difficult to perform the image restoration. In addition, an image deterioration due to blurring caused by the image pickup apparatus, as well as the image blur (caused by the shake), occurs in the shot image. Difficulty of the image restoration changes depending on characteristics of the image blur (shake) and the blurring. The difficulty of the image restoration means ease of occurrence of a negative effect which is not acceptable in the image restoration. The difficulty of the image restoration is high when the negative effect easily occurs, and on the contrary, the difficulty is low when it does not easily occurs. Japanese Patent Laid-open Nos. 2004-239962 and 2005-252760 do not disclose the negative effect.

SUMMARY OF THE INVENTION

The present invention provides an image processing apparatus, an image pickup apparatus, an image processing method, and a non-transitory computer-readable storage medium that are capable of restoring a blurred image appropriately.

An image processing apparatus as one aspect of the present invention includes a determination unit configured to determine an optical transfer function based on shooting condition information, an acquisition unit configured to acquire shake information, a control unit configured to select a method of image restoration based on the optical transfer function and the shake information, and an image restoration unit configured to perform the image restoration based on the selected method of the image restoration.

An image pickup apparatus as another aspect of the present invention includes an image pickup unit configured to photoelectrically convert an optical image formed via an image pickup optical system, a determination unit configured to determine an optical transfer function based on shooting condition information, an acquisition unit configured to acquire shake information, a control unit configured to select a method of image restoration based on the optical transfer function and the shake information, and an image restoration unit configured to perform the image restoration based on the selected method of the image restoration.

An image processing method as another aspect of the present invention includes the steps of determining an optical transfer function based on shooting condition information, acquiring shake information, selecting a method of image restoration based on the optical transfer function and the shake information, and performing the image restoration based on the selected method of the image restoration.

A non-transitory computer-readable storage medium as another aspect of the present invention stores an image processing program to cause a computer to execute a process including the steps of determining an optical transfer function based on shooting condition information, acquiring shake information, selecting a method of image restoration based on the optical transfer function and the shake information, and performing the image restoration based on the selected method of the image restoration.

Further features and aspects of the present invention will become apparent from the following description of exemplary embodiments with reference to the attached drawings.

BRIEF DESCRIPTION OF THE DRAWINGS

FIGS. 5A to 5C are diagrams of illustrating an example of an image restoration effect when performing the image restoration only for the shake characteristics in Embodiment 1.

FIGS. 7A to 7C are diagrams of illustrating an example of an image restoration effect when performing the image restoration for the blurring and the shake characteristics in Embodiment 1.

FIGS. 8A to 8C are diagrams of illustrating an example of an image restoration effect when performing the image restoration only for the blurring in Embodiment 1.

FIGS. 10A to 10C are diagrams of illustrating an example of an image restoration effect when performing the image restoration for the blurring and the shake characteristics in Embodiment 1.

FIGS. 11A to 11C are diagrams of illustrating an example of an image restoration effect when performing the image restoration only for the blurring in Embodiment 1.

DESCRIPTION OF THE EMBODIMENTS

Figure 1:
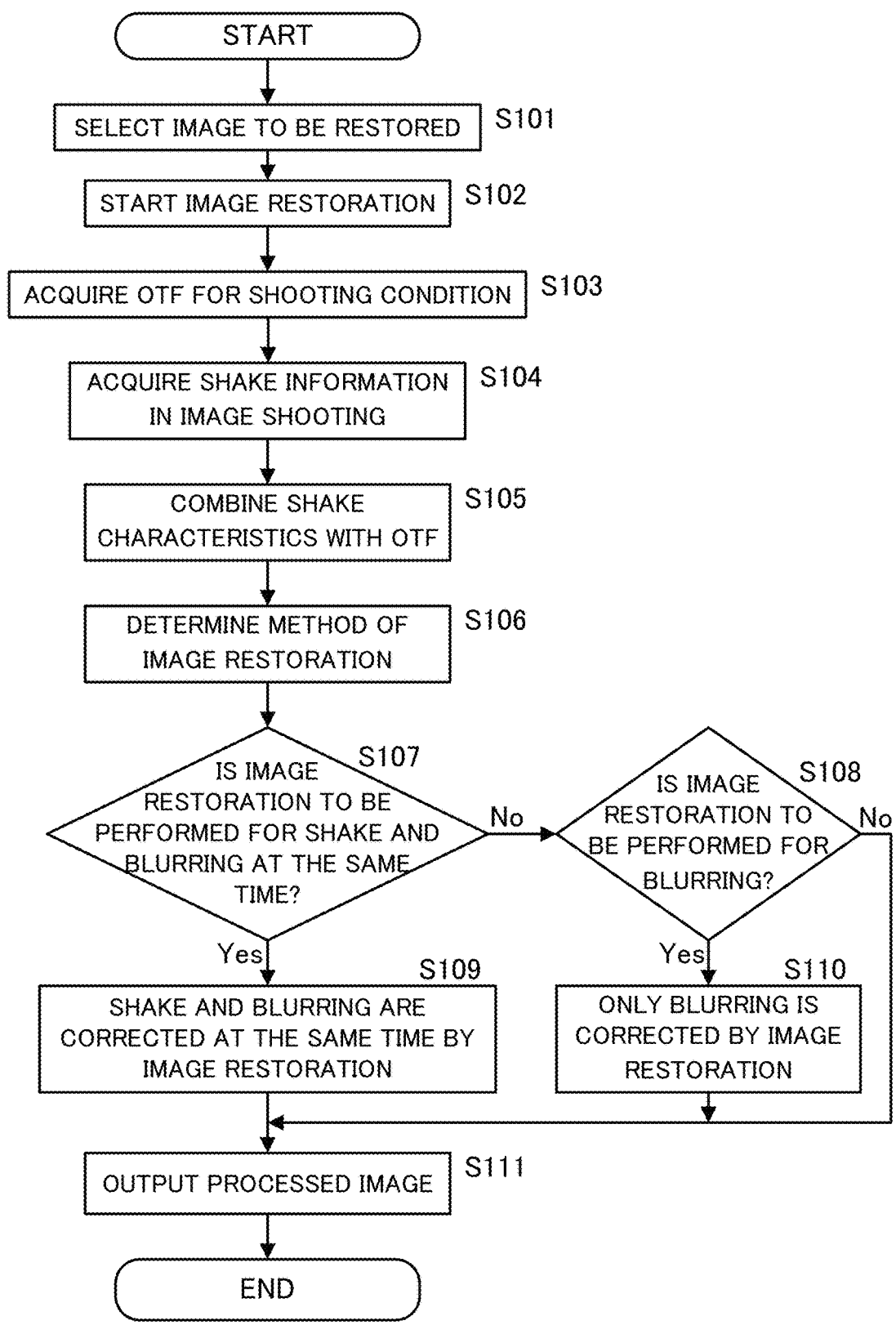
FIG. 1 is a flowchart of an image processing method (image restoration) in Embodiment 1.

Exemplary embodiments of the present invention will be described below with reference to the accompanied drawings.

First of all, an outline of an image processing method (image restoration) in this embodiment will be described. The following Expression (1) is satisfied where, in a real space (x,y), f(x,y) is an image which is not deteriorated by an optical system, h(x,y) is a PSF (point spread function), and g(x,y) is a deteriorated image.

$$g(x,y)=\iint f(X,Y)*h(x-X,y-Y)dXdY \quad (1)$$

When the Fourier transform is performed for Expression (1) to convert the real space (x,y) to a frequency space (u,v), the following Expression (2) is satisfied.

$$G(u,v)=F(u,v)*H(u,v) \quad (2)$$

In Expression (2), F(u,v), G(u,v), and H(u,v) are results of the Fourier transform of f(x,y), g(x,y), and h(x,y), respectively. Therefore, the following Expression (3) is satisfied.

$$F(u,v)=G(u,v)/H(u,v) \quad (3)$$

Expression (3) means that the result F(u,v) of the Fourier transform of the image f(x,y) which is not deteriorated can be obtained by dividing the result G(u,v) of the Fourier transform of the deteriorated image g(x,y) in the frequency space by the result H(u,v) of the Fourier transform of the point spread function h(x,y). Therefore, the image f(x,y) which is not deteriorated can be obtained by performing the inverse Fourier transform for F(u,v).

Actually, however, if such processing is performed to obtain the image which is not deteriorated, a noise caused by an image pickup element is amplified and ringing, such as a fine linear-shaped signal and a striped pattern, is highly likely to occur on the image. Thus, it is difficult to obtain an appropriate image with the division by simple inverse characteristics.

As a method of restoring an image to suppress the amplification of the noise, using the Wiener filter W(u,v) represented by the following Expression (4) is known.

$$W(u,v)=1/H(u,v)*|H(u,v)|^2/(|H(u,v)|^2+\Gamma) \quad (4)$$

In Expression (4), symbol H(u,v) denotes an optical transfer function (OTF), and symbol Γ denotes a constant to reduce an amount of the amplification of the noise.

Multiplying W(u,v) represented by Expression (4) by the result G(u,v) of the Fourier transform of the deteriorated image g(x,y), a phase component of the PSF caused due to the diffraction or the aberration that occurs in the optical system becomes zero and frequency characteristics of an amplitude component are amplified to be able to obtain a high-resolution and appropriate image. That is, the following Expression (5) is satisfied where R(u,v) is frequency space information of an image restored by the image restoration using the Wiener filter.

$$R(u,v)=G(u,v)*W(u,v) \quad (5)$$

Considering a typical shooting environment, an image deterioration caused by a shake (i.e. image blur due to a hand shake) is likely to occur in shooting an image. Recently, an image pickup apparatus has been known which is capable of reducing the image deterioration caused by the shake by using an image stabilizer (image blur correction unit) without using a fixing member such as a tripod. However, even when the image pickup apparatus including the image stabilizer is used, effective image stabilization cannot be achieved in some cases if an amount of the shake is increased.

The following Expression (6) is satisfied, where S(u,v) is frequency characteristics of the shake (shake characteristics) and Hs (u,v) is an optical transfer function (OTF) containing the frequency characteristics of the shake.

$$Hs(u,v)=H(u,v)*S(u,v) \quad (6)$$

Furthermore, replacing H(u,v) in Expression (4) with Hs(u,v), the Wiener filter W(u,v) is represented as the following Expression (7).

$$W(u,v)=1/Hs(u,v)*|Hs(u,v)|^2/(|Hs(u,v)|^2+\Gamma) \quad (7)$$

As described above, using Expression (7), it is possible to correct the burring and the shake at the same time. Hereinafter, blurring characteristics, shake characteristics, and blurring characteristics (image blur characteristics) containing the shake characteristics are referred to as H(u,v), S(u,v), and Hs(u,v), respectively. Typically, there is a common problem to be solved for restoration processing on an image containing the shake characteristics. In other words, an amount of deterioration of the image caused by the shake characteristics S(u,v) is extremely large, and the characteristics behave to cross zero many times. As described above, since the image restoration is processing to restore an image by division, H(u0, v0)=0 may be satisfied in Expression (3) and such a problem can always occur. Hereinafter, this case is referred to as degradation, and each embodiment is performed or configured to avoid the degradation.

Embodiment 1

Next, referring to FIG. 1, an image processing method (image restoration) in Embodiment 1 of the present invention will be described. FIG. 1 is a flowchart of the image processing method in this embodiment. Each step (image processing method in this embodiment) in FIG. 1 is performed by an image processor provided in an image processing apparatus or an image pickup apparatus.

First of all, at step S101, the image processor selects an image (shot image) on which the image restoration is to be performed. This image previously contains various information (shooting condition information) determined when shooting the image. Then, at step S102, the image processor starts the image restoration. Subsequently, at step S103, the image processor acquires an optical transfer function (OTF) of an image pickup optical system based on a focal length of the image pickup optical system, an F number, an object distance, and the like determined when shooting the image, which are contained in the shooting condition information. The shooting condition information includes information of an image pickup element such as a pixel pitch and a pixel opening shape and information of an optical low-pass filter, and the image processor generate the OTF reflecting these pieces of information (characteristics of the image pickup element or the optical low-pass filter). In addition, since the characteristics of the OTF vary depending on an image height, the image processor generates the OTF for each image height. The OTF determined at step S103 is an OTF (first OTF) which is used to perform the image restoration to correct blurring (i.e. blurring caused by influences such as a diffraction and an aberration of the image pickup optical system).

Subsequently, at step S104, the image processor acquires information (shake information or image blur information) on a shake (image blur caused by the shake of an image pickup apparatus such as a hand shake) determined when shooting the image. When the image pickup apparatus is provided with a gyro sensor, the image processor uses, as the shake information, a signal obtained from the gyro sensor or information based on the signal. When the image pickup apparatus (image pickup optical system) is provided with an optical image stabilizer (image blur correction unit), the image processor uses, as the shake information, information as to whether or not the image stabilizer is driven and information on a moving locus of an image stabilizing lens unit driven to perform the image stabilization. Instead of the moving locus of the image stabilizing lens unit, the image processor may use information on a maximum value of the shake or on an average coordinate of the shake. The image processor calculates frequency characteristics of the shake (shake characteristics) based on the shake information. Then, at step S105, the image processor performs calculation so that the shake characteristics are multiplied by (combined to) the OTF (first OTF) acquired at step S103 to generate an OTF (second OTF) reflecting the influence of the shake (image blur caused by the shake). The OTF determined at step S105 is an OTF (second OTF) to perform the image restoration so as to correct the blurring and the shake.

Figure 2:
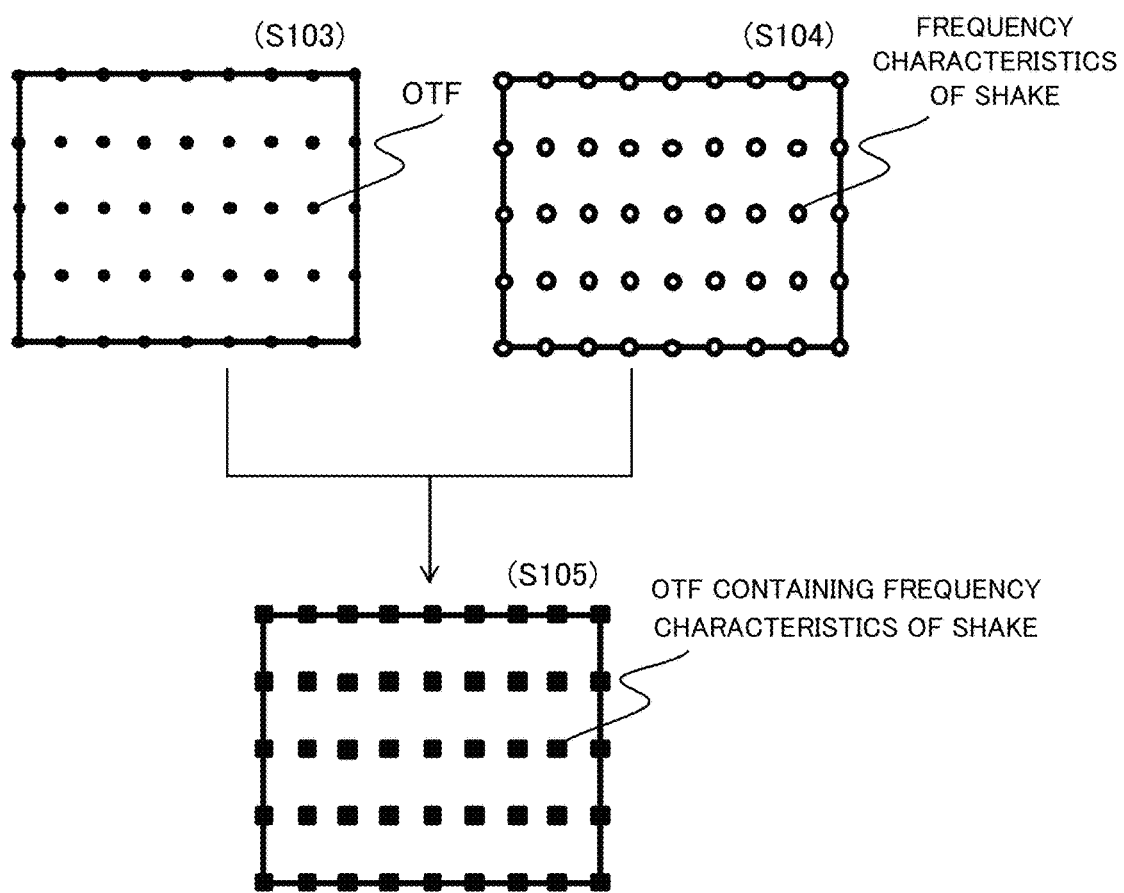
FIG. 2 is a diagram of illustrating a process of generating an OTF containing shake characteristics in Embodiment 1.

Referring to FIG. 2, a process (steps S103 to S105) of generating the OTF containing the frequency characteristics of the shake (shake characteristics) will be specifically described. FIG. 2 is a diagram of illustrating the process of generating the OTF containing the shake characteristics.

The image processor prepares a previously assumed OTF corresponding to the image pickup optical system, which is stored in an internal or external storage unit. Then, the image processor acquires an OTF corresponding to each image height position with respect to the shooting condition (based on the shooting condition information) described above (step S103). Furthermore, the image processor acquires the shake characteristics corresponding to each image height position (step S104). Subsequently, the image processor combines the shake characteristics of the image pickup apparatus with the OTF acquired based on the shooting condition information to generate an OTF combined with the shake characteristics (OTF containing the shake characteristics) (step S105). When it is difficult to use the shake characteristics variable depending on the image height described above in terms of a processing load and an amount of data, the shake characteristics may be constant independently of the image height.

Subsequently, at step S106 in FIG. 1, the image processor determines the image restoration (method of the image restoration). When both of the shake (image blur caused by the shake) and the blurring need to be corrected in the image restoration, it may be difficult to perform the image restoration because the degradation of the frequency of the OTF occurs by the shake or a large amount of variation occurs by the modulation of the OTF. Therefore, it is preferred that the image restoration is performed considering both the deterioration caused by the shake and the deterioration caused by the blurring at the same time. Whether the image blur correction is to be performed depends on the OTF which does not contain the shake in addition to an amount of the shake. Accordingly, when the image processor corrects an image containing both the shake and the blurring, first, a method of the image restoration is selected. The selection of the method of the image restoration is for example to select one of three methods of the image restoration, i.e. a process of correcting both the shake and the blurring, a process of correcting only the blurring, and a process of correcting neither the shake nor the blurring.

Subsequently, an example of criteria of selecting the method of the image restoration at step S106 will be described. First of all, the image processor multiplies frequency characteristics of the shake (shake characteristics) by the OTF acquired when the shake does not occur to generate an OTF containing the shake and the blurring. Next, the image processor generates a modulation transfer function (MTF) that is an absolute value of the generated OTF. Then, the image processor determines the method of the image restoration based on a dip (frequency dip) of the MTF. Hereinafter, a real part component and an imaginary part component of the OTF are referred to as reOTF and imOTF, respectively. In this embodiment, the dip means a dent (dent region) which occurs in a frequency space. In this embodiment, the dent is defined as a dip when, in an arbitrary frequency, an MTF value higher than an MTF value (MTF-$_{DIP}$) of the dip by at least 5% exists at a high frequency side relative to the dip. However, this embodiment is not limited thereto and the dip (dent) can be defined based on other criteria. For example, when there is a region in which the MTF value is not greater than a predetermined value ($0 \leq MTF_{DIP} \leq 0.1$ or $0 \leq MTF_{DIP} \leq 0.05$), the region can be defined as a dent (dip).

Figure 3:
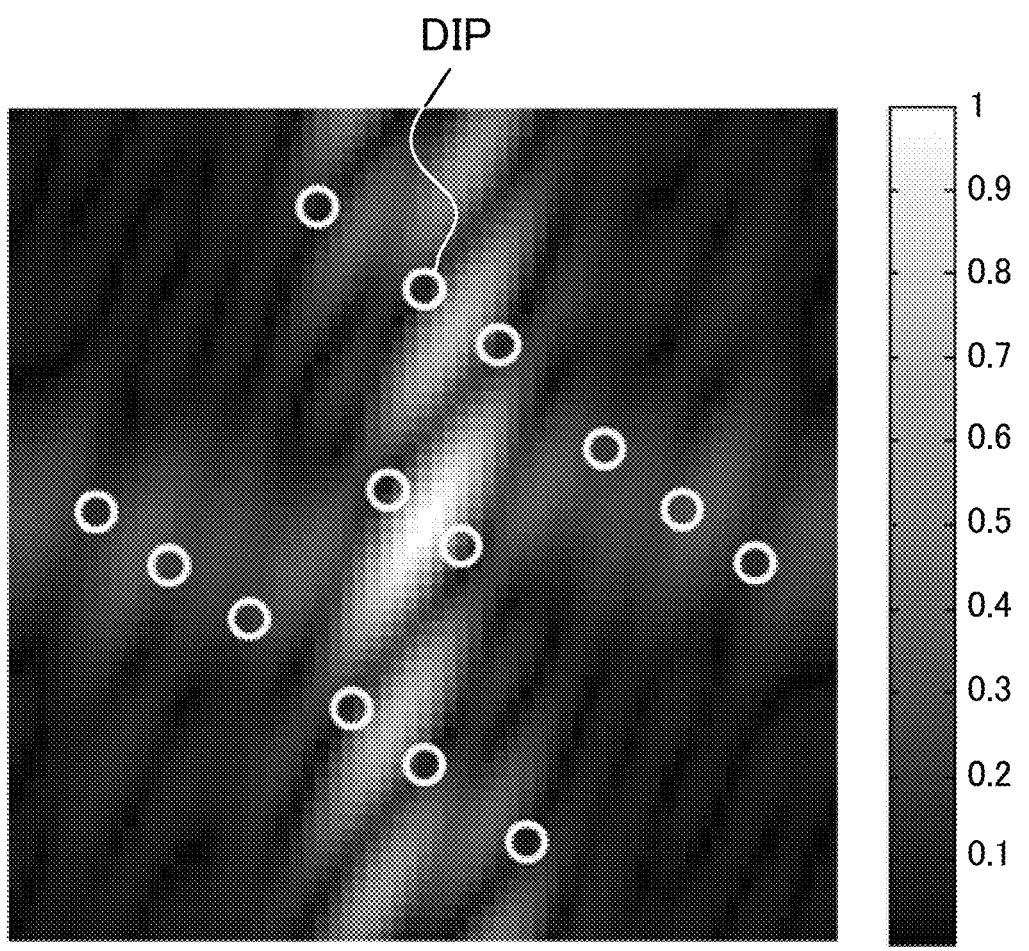
FIG. 3 is a diagram of illustrating an example of a frequency dip of the OTF containing the shake characteristics in Embodiment 1.

When, as a first determination, the number of the dips of the MTF exceeds a predetermined number, the image processor selects a process (first process) in which neither the shake nor the blurring is not corrected (i.e. the image processor does not perform the image restoration). In this case, the flow of FIG. 1 proceeds to step S111 via steps S107 and S108. The number of the dips of the MTF may be the number in a two-dimensional frequency space or the number in a specific one-dimensional direction. FIG. 3 is an example of a frequency dip of the OTF containing the shake characteristics, and illustrates a two-dimensional MTF multiplied by the shake characteristics. White circles in FIG. 3 are the dips.

When the number of the dips of the MTF does not exceed the predetermined number in the first determination, the image processor performs a second determination. In the second determination, the image processor selects, based on a position and a value of the dip of the MTF, one of a process (second process) of correcting the shake and the blurring at the same time or a process (third process) of correcting only the blurring. Preferably, the image processor selects one of the second process or the third process based on a position and a value of the dip having the lowest frequency of the dips of the MTF. When the second process is selected, the flow proceeds to step S109 via step S107. At step S109, the image processor performs the image restoration to correct both the shake and the blurring and then the flow proceeds to step S111. On the other hand, when the third process is selected, the flow proceeds to step S110 via steps S107 and S108. At step S110, the image processor performs the image restoration to correct only the blurring, and then the flow proceeds to step S111. Then, at step S111, the image processor outputs an image (restored image) which is obtained by performing the first, second, or third process.

Figures 4A, 4B, 4C:
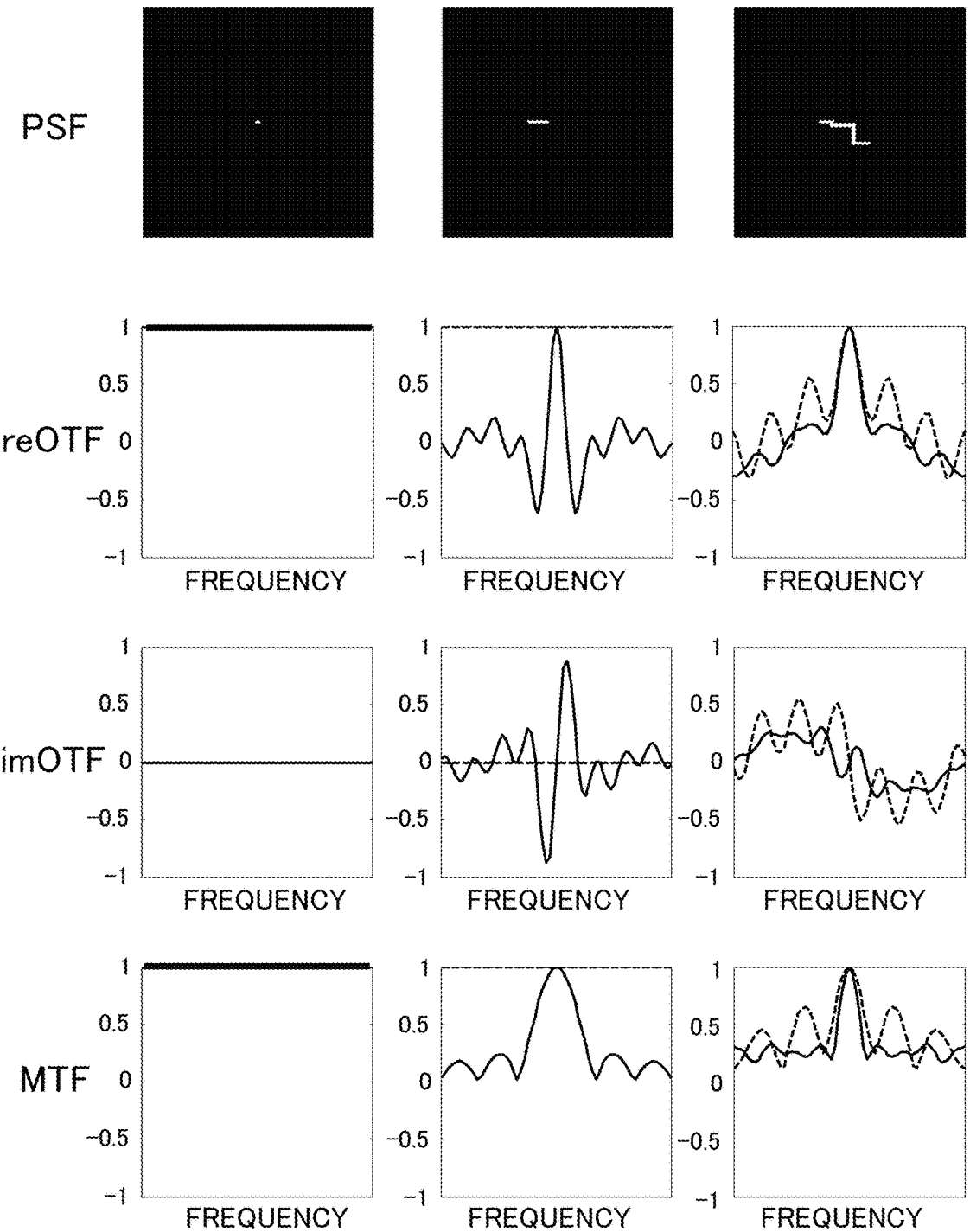
FIGS. 4A to 4C are diagrams of illustrating an example of the shake characteristics in Embodiment 1.

Next, a method of determining the image restoration (method of the image restoration) based on the dip of the MTF will be described in detail. FIGS. 4A to 4C are diagrams of illustrating an example of the shake characteristics. FIGS. 4A to 4C illustrate a casein which an optical performance at the center part of an imaging region is appropriate (good), and the deterioration of the shot image occurs caused only by the shake. A dot line of each graph in FIGS. 4A to 4C indicates frequency characteristics of a PSF in a vertical direction, and a solid line indicates frequency characteristics of the PSF in a horizontal direction. In each graph, a lateral axis is standardized by ±Nyquist frequency. In each graph, as described above, the PSF does not contain the deterioration caused by the blurring, and accordingly each graph represents the shake characteristics (frequency characteristics of the shake) themselves.

FIG. 4A illustrates a case in which the PSF exists only in one pixel of the image pickup element. In this case, the real part reOTF and the imaginary part imOTF of the OTF respectively indicates 1 and 0 over an entire frequency within a band, and the MTF indicates 1 over the entire frequency within the band. FIG. 4B illustrates a case in which the PSF of FIG. 4A is slightly shifted due to the shake. FIG. 4C illustrates a case in which the PSF of FIG. 4A is shifted by a large amount compared to that in FIG. 4B. Referring to FIGS. 4B and 4C, all of the real part reOTF, the imaginary part imOTF, and the MTF oscillate with large amplitudes, and a lot of dips (dents) are generated. FIGS. 4B and 4C illustrate characteristics of the oscillations that pass around 0 many times. Thus, when a value of the frequency characteristics at a low frequency side is extremely less than that at a high frequency side in addition to the case where the value of the frequency characteristics simply indicates a value near 0, it is difficult to perform the image restoration appropriately. In this case, it is not expected that an appropriate result can be obtained even when the image restoration is performed by considering the shake. Therefore, it is preferred that the image restoration is performed only for a component of the blurring.

FIGS. 5A to 5C are diagrams of an example of an image restoration effect when the image restoration is performed only for the shake characteristics. Shot images (upper side) and restored images (lower side) of FIGS. 5A to 5C correspond to images which are obtained by correcting the shake in FIGS. 4A to 4C, respectively. Comparing the shot images with the restored images illustrated in FIGS. 5A to 5C, ringing and unevenness occur at an edge portion of an object in the restored images illustrated in FIGS. 5B and 5C. These phenomena occur due to a large amount of the shake of the OTF described above, and they may be adverse effects caused by the image restoration. Accordingly, in this case, it is preferred that the image restoration itself is not performed.

Figures 6A, 6B, 6C:
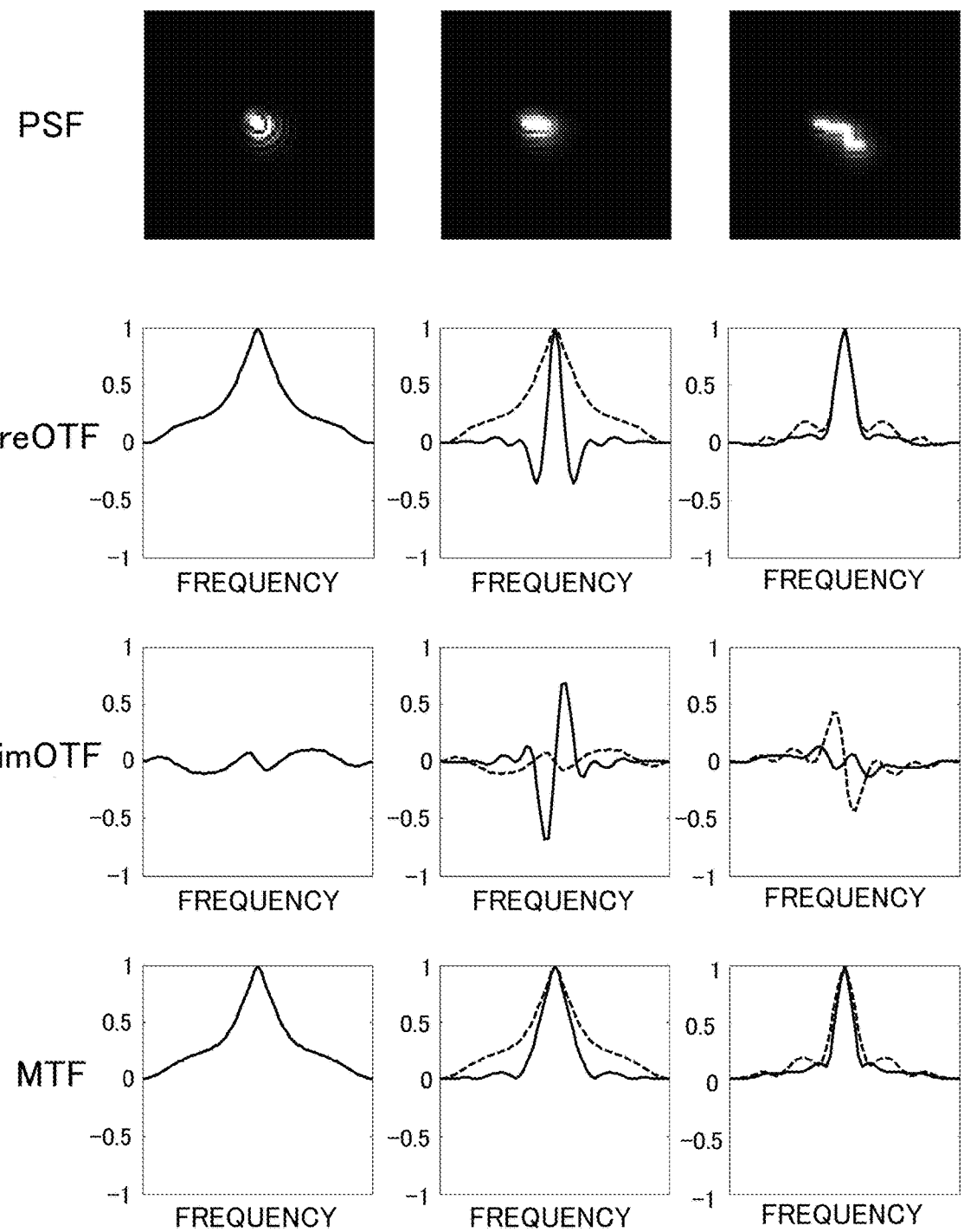
FIGS. 6A to 6C are diagrams of illustrating an example of blurring and the shake characteristics in Embodiment 1.

FIGS. 6A to 6C are diagrams of illustrating an example of the blurring and the shake characteristics, and they illustrate a case in which an optical performance corresponding to a periphery of an image pickup region is not appropriate. Shake amounts of FIGS. 6A to 6C are the same as those of FIGS. 4A to 4C, respectively. Similarly to FIGS. 4A to 4C, a dotted line of each graph in FIGS. 6A to 6C indicates frequency characteristics of the PSF in the vertical direction, and a solid line indicates frequency characteristics of the PSF in the horizontal direction. Similarly, a lateral axis in each graph is standardized by the ±Nyquist frequency.

FIG. 6A illustrates the PSF when the shake does not occur. In this case, the real part reOTF of the OTF gently degrases with increase in frequency, and the imaginary part imOTF similarly indicates gentle characteristics. Similarly, the MTF gently decreases with increase in frequency. FIG. 6B illustrates a case in which the PSF of FIG. 6A is shifted, due to the shake, along a locus of the PSF illustrated in FIG. 4B.

FIG. 6C illustrates a case in which the PSF of FIG. 6A is shifted with an amount larger than that of FIG. 6B, due to the shake, along a locus of the PSF illustrated in FIG. 4C. As illustrated in FIG. 6B, for the real part reOTF, the imaginary part imOTF, and the MTF, oscillation caused by the shake can be seen, but an amount of the oscillation is small compared to that in FIG. 4B. In this case, it is possible to perform appropriate image restoration by paying attention similarly to the case in which the optical performance is low and the shake does not occur. In other words, for example, when the image restoration is performed while limiting the band to be in a range from DC where the frequency is 0 (zero) to the first dip in the OTF, the appropriate image restoration can be performed. In FIG. 6C, an amount of the modulation of the OTF caused by the shake is large, and thus it is difficult to perform the appropriate image restoration without occurrence of the adverse effect. Accordingly, in FIG. 6C, it is preferred that the image restoration is performed only for the blurring component without performing the image restoration for the shake component.

FIGS. 7A to 7C are diagrams of illustrating an example of an image restoration effect when both the blurring and the shake characteristics are corrected by the image restoration. Shot images (upper side) and restored images (lower side) in FIGS. 7A to 7C correspond to cases in which the blurring and the shake are corrected in FIGS. 6A to 6C, respectively. FIG. 7A illustrates the shot image and the restored image containing only the blurring without the shake. FIGS. 7B and 7C illustrate the restored images obtained by correcting the shake and the blurring contained in the shot images at the same time. In FIG. 7A, an appropriate restored image can be obtained since the shot mage does not contain the shake. In FIG. 7B, the OTF is modulated due to the shake as described above. However, since the OTF obtained by multiplying the shake characteristics has gentle characteristics as illustrated in FIG. 6B, an appropriate restored image can be obtained from the shot image of FIG. 7B. On the other hand, since an amount of the shake is large in FIG. 7C, it is difficult to obtain the restored image appropriately from the shot image (i.e. to restore the image without adverse effects).

FIGS. 8A to 8C are diagrams of illustrating an example of an image restoration effect when only the blurring is corrected by the image restoration. Shot images (upper side) and restored images (lower side) in FIGS. 8A to 8C correspond to cases in which only the blurring is corrected in FIGS. 6A to 6C, respectively. In FIGS. 8A to 8C, only for the blurring component, the restored images can be obtained appropriately from the shot images.

Figures 9A, 9B, 9C:
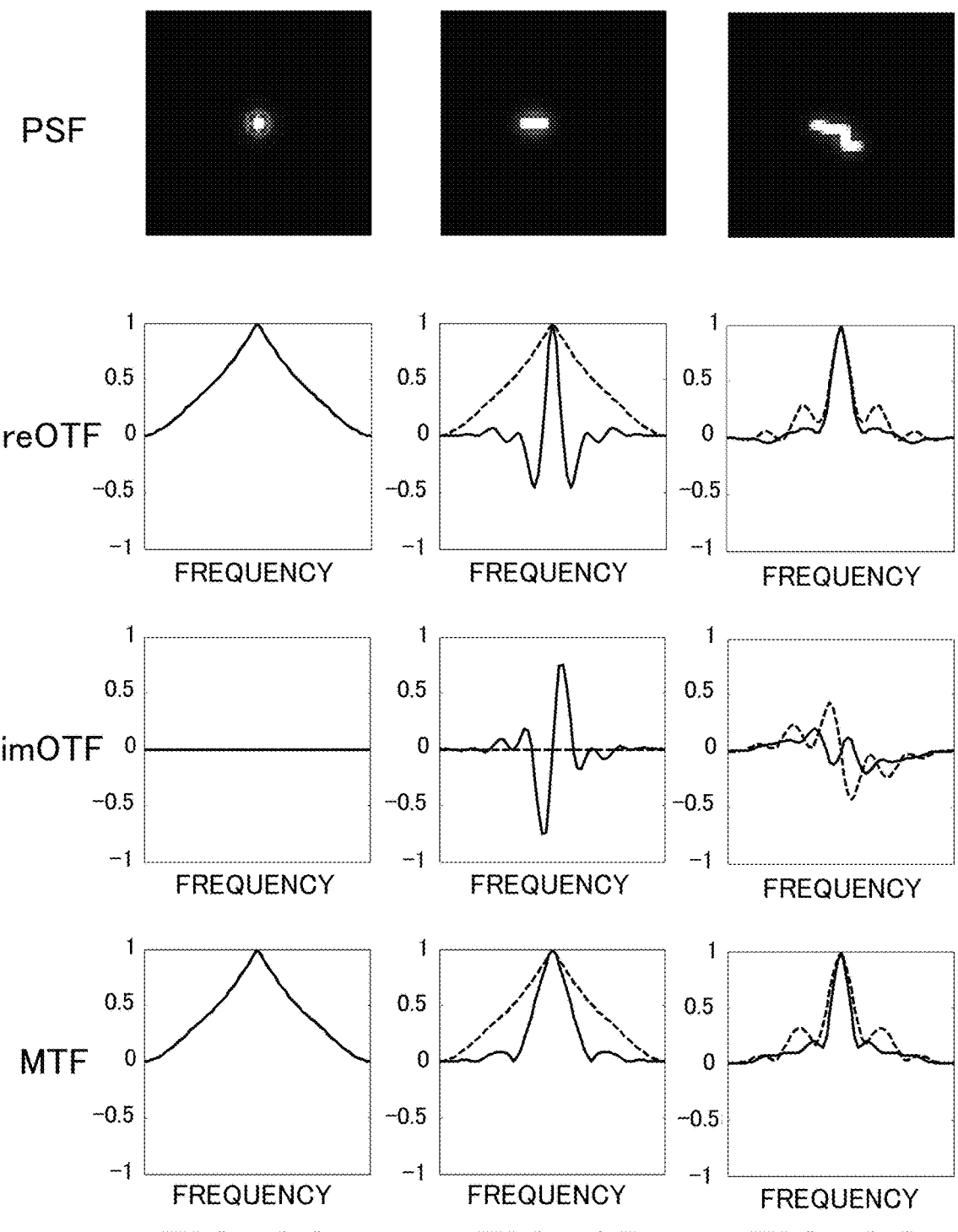
FIGS. 9A to 9C are diagrams of an example of the blurring and the shake characteristics in Embodiment 1.

FIGS. 9A to 9C are diagrams of illustrating an example of the blurring and the shake characteristics, and they illustrate a case in which an optical performance intermediate between the optical performance of FIGS. 4A to 4C and the optical performance of FIGS. 6A to 6C. Shake amounts of FIGS. 9A to 9C are the same as those of FIGS. 4A to 4C, respectively. Similarly to FIGS. 4A to 4C, a dotted line of each graph in FIGS. 9A to 9C indicates frequency characteristics of the PSF in the vertical direction, and a solid line indicates frequency characteristics of the PSF in the horizontal direction. Similarly, a lateral axis of each graph in FIGS. 9A to 9C is standardized by the ±Nyquist frequency.

FIG. 9A illustrates a state in which the image restoration can be performed appropriately since the shake does not occur. FIG. 9B illustrates a state in which the characteristics obtained by combining the frequency characteristics of the shake (shake characteristics) with the OTF related to the blurring are close to a boundary where it is possible to perform the image restoration appropriately (i.e. it is possible to perform the image restoration without occurrence of adverse effects). In this case, when the image restoration is performed while limiting the band to be in a range from DC where the frequency is 0 (zero) to the first dip in the OTF, the appropriate image restoration can be performed. On the other hand, FIG. 9C illustrates a state in which an amount of the shake is large and it is difficult to perform the image restoration appropriately.

FIGS. 10A to 10C are diagrams of illustrating an example of an image restoration effect when both the blurring and the shake characteristics are corrected by the image restoration. Shot images (upper side) and restored images (lower side) in FIGS. 10A to 10C correspond to cases in which the blurring and the shake are corrected in FIGS. 9A to 9C, respectively. FIG. 10A illustrates the shot image and the restored image containing only the blurring without the shake. FIGS. 10B and 10C illustrate the restored images obtained by correcting the shake and the blurring contained in the shot images at the same time. In FIG. 10A, an appropriate restored image can be obtained since the shot mage does not contain the shake. In FIG. 10B, the OTF is modulated due to the shake as described above, but an appropriate restored image can be obtained from the shot image. On the other hand, since an amount of the shake is large in FIG. 10C, it is difficult to correct the shake and the blurring at the same time (i.e. obtain the restored image appropriately from the shot image).

FIGS. 11A to 11C are diagrams of illustrating an example of an image restoration effect when only the blurring illustrated in FIGS. 9A to 9C is corrected by the image restoration. Shot images (upper side) and restored images (lower side) in FIGS. 11A to 11C correspond to the cases in which only the blurring is corrected in FIGS. 9A to 9C, respectively. In FIGS. 11A to 11C, only for the blurring component, the restored images can be appropriately obtained from the shot images.

Embodiment 2

Figure 12:
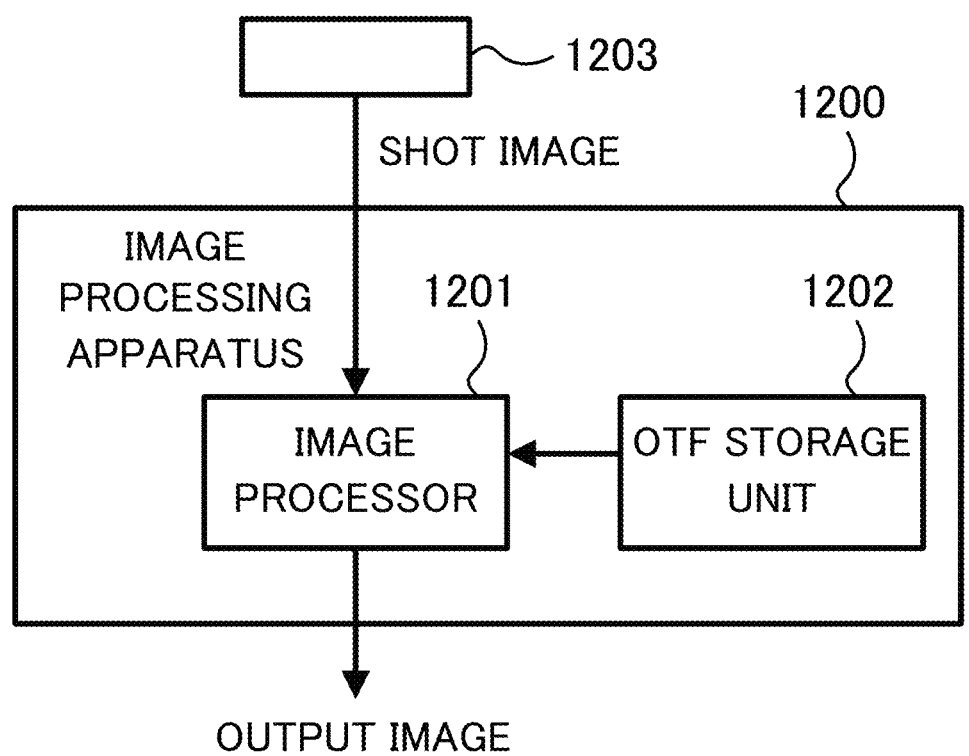
FIG. 12 is a block diagram of an image processing apparatus in Embodiment 2.

Next, referring to FIG. 12, an image processing apparatus in Embodiment 2 of the present invention will be described. FIG. 12 is a block diagram of an image processing apparatus 1200 in this embodiment. The image processing apparatus 1200 is capable of performing the image processing method (image processing program) in Embodiment 1.

The image processing apparatus 1200 includes an image processor 1201 and an OTF storage unit 1202. The image processor 1201 is provided with a determination unit, an acquisition unit, a control unit, and an image restoration unit, similarly to an image processor 1304 in Embodiment 3 described below. In order to perform the image restoration, the image processing apparatus 1200 (image processor 1201) inputs an image (shot image) containing a shooting condition (shooting condition information) and shake information determined when shooting an image. The shot image can be input by wired or wireless connections from an apparatus 1203 provided outside the image processing apparatus 1200.

Alternatively, the shot image can also be input to the image processing apparatus 1200 via a storage medium 1204 such as a CD-ROM.

The image processor 1201 acquires an OTF (first OTF) from the OTF storage unit 1202 based on the shooting condition information of the input image (shot image). The OTF storage unit 1202 stores an OTF corresponding to each shooting condition. In this embodiment, the image processor 1201 acquires the OTF consistent with the shooting condition (i.e. OTF corresponding to the shooting condition) based on the shooting condition information of the input image. When the OTF consistent with the shooting condition of the input image is not stored in the OTF storage unit 1202, the image processor 1201 acquires the OTF (first OTF) corresponding to the shooting condition which is similar to that of the input image. Then, the image processor 1201 weights the shooting condition and generates the OTF corresponding to the shooting condition of the input image by performing the interpolation.

Subsequently, the image processor 1201 selects and determines the image restoration (method of the image restoration) based on the shooting condition information and the shake information of the input image. The selection of the image restoration is performed with the same criteria as those in Embodiment 1 described referring to step S106 in FIG. 1. When the image processor 1201 performs the image restoration to correct the blurring and the shake characteristics for the input image, it obtains the shake characteristics based on the shake information of the input image. Then, the image processor 1201 multiplies the shake characteristics by the OTF (first OTF) and performs the image restoration by using an OTF (second OTF) containing the shake characteristics. Then, the image processing apparatus 1200 (image processor 1201) outputs an image (restored image) as an output image which is obtained by performing the image restoration.

Embodiment 3

Figure 13:
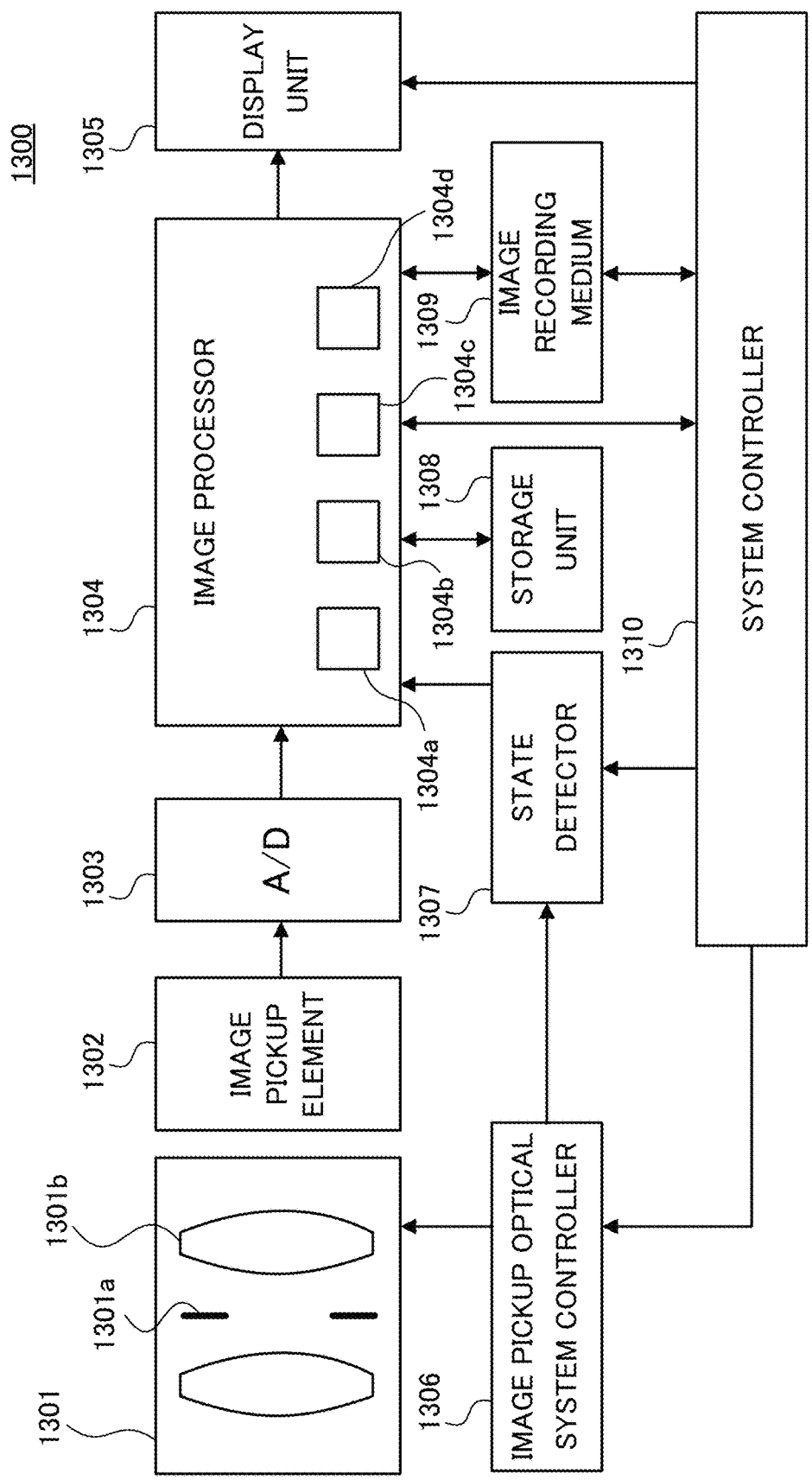
FIG. 13 is a block diagram of an image pickup apparatus in Embodiment 3.

Next, referring to FIG. 13, an image pickup apparatus in Embodiment 3 of the present invention will be described. FIG. 13 is a block diagram of an image pickup apparatus 1300 in this embodiment. The image pickup apparatus 1300 is provided with an image processing apparatus (image processor 1304) capable of performing the image processing method (image processing program) in Embodiment 1.

In the image pickup apparatus 1300, an object (not illustrated) is imaged on an image pickup element 1302 via an image pickup optical system 1301 including an aperture stop 1301a (or light blocking member) and a focus lens 1301b. An aperture value (F number) is determined by the aperture stop 1301a or the light blocking member. The image pickup element 1302 photoelectrically converts an object image formed via the image pickup optical system 1301 to acquire a shot image. The shot image (imaged light) acquired by the image pickup element 1302 is converted to an electric signal and then output to an A/D converter 1303. The A/D converter 1303 converts the electric signal (analog signal) input from the image pickup element 1302 to a digital signal and then outputs the digital signal to the image processor 1304.

The image processor 1304 performs the image restoration (image processing method) of Embodiment 1, as well as predetermined processing. First of all, the image processor 1304 acquires a shooting condition (shooting condition information) of the image pickup apparatus 1300 from a state detector 1307. The shooting condition information includes an aperture value (F number), a shooting distance, a focal length of the zoom lens, and the like. The state detector 1307 is capable of acquiring the shooting condition information directly from a system controller 1310 (controller), and for example it can also acquire shooting condition information on the image pickup optical system 1301 from an image pickup optical system controller 1306. A storage unit 1308 stores optical transfer function information (OTF information) for each shooting condition (for each combination of the focal length, the F number, the shooting distance, the image height, the pixel size of the image pickup element 1302, identification information of the image pickup optical system 1301, and the like).

The image processor 1304 is provided with a determination unit 1304a, an acquisition unit 1304b, a control unit 1304c, and an image restoration unit 1304d. The determination unit 1304a determines an optical transfer function based on the shooting condition information. The acquisition unit 1304b acquires shake information. The control unit 1304c selects a method of image restoration based on the optical transfer function and the shake information. The image restoration unit 1304d performs the image restoration by using the selected method of the image restoration.

An output image (restored image) processed by the image processor 1304 is recorded in an image recording medium 1309 in a predetermined format. A display unit 1305 displays an image obtained by performing predetermined processing for display on the processed image in this embodiment. Alternatively, the display unit 1305 may display an image obtained by performing simple processing for high-speed display. The display unit 1305 also displays a GUI to select an image restoration mode or a normal shooting mode by a user. When the image restoration mode is selected by the user via the GUI on the display unit 1305, a system controller 1310 controls the image processor 1304 to perform the image processing method described referring to FIG. 1.

In the image restoration mode, the image pickup element 1302 photoelectrically converts an optical image obtained via the image pickup optical system 1301 to an electric signal to output a shot image. In this case, the image pickup optical system controller 1306 and the state detector 1307 acquire the shooting condition such as identification information of the image pickup optical system 1301, a focal length at the time of shooting an image, a shooting distance, an F number, and a pixel size of the image pickup element 1302. In addition, the image pickup optical system controller 1306 and the state detector 1307 acquire the shake information at the time of shooting the image. The A/D converter 1303 converts an analog signal output from the image pickup element 1302 to a digital signal. The image processor 1304 determines a method of the image restoration based on OTF information determined based on the acquired shooting condition and shake information, and it performs the image restoration for the shot image.

The image processor 1304 is connected to the image recording medium 1309 to record the shot image containing the shooting condition information. The OTF information corresponding to the shooting condition at the time of capturing the shot image recorded in the image recording medium 1309 are stored in the storage unit 1308 as described above. The system controller 1310 includes a CPU, an MPU, or the like, and it controls a whole of the image pickup apparatus 1300.

In this embodiment, the image pickup optical system 1301 (lens apparatus) is configured integrally with the image pickup apparatus (image pickup apparatus body), but is not limited thereto. Alternatively, the image pickup optical system 1301 may be an interchangeable lens which is removably mounted on the image pickup apparatus body such as a single-lens reflex camera.

As described above, in the image processing apparatus (or image pickup apparatus) of each embodiment, a determination unit 1304a determines an optical transfer function based on shooting condition information. The acquisition unit 1304b acquires shake information. The control unit 1304c selects a method of image restoration based on the optical transfer function and the shake information. The image restoration unit 1304d performs the image restoration based on the selected method of the image restoration. The term "selects a method of image restoration" means for example selecting whether or not the image restoration is to be performed, or selecting either one of the first or second optical transfer function to be used for performing the image restoration, but is not limited thereto.

Preferably, the determination unit 1304a determines, as a first optical transfer function (first OTF), the optical transfer function based on the shooting condition information, and determines a second optical transfer function (second OTF) based on the first optical transfer function and the shake information. More preferably, when the image restoration unit 1304d performs the image restoration, the control unit 1304c selects, as the method of the image restoration, either one of performing the image restoration by using the first optical transfer function or by using the second optical transfer function. More preferably, the control unit 1304c is configured to select any one of performing the image restoration by using the first optical transfer function, performing the image restoration by using the second optical transfer function, or not performing the image restoration. More preferably, the determination unit 1304a combines (multiplies), with (by) the first optical transfer function, frequency characteristics of a shake (shake characteristics) acquired based on the shake information to determine the second optical transfer function.

Preferably, the control unit 1304c selects the method of the image restoration based on a modulation transfer function (MTF) that is an absolute value of the first or second optical transfer function. More preferably, the control unit 1304c selects the method of the image restoration based on a dip region (frequency dip) of the modulation transfer function. Preferably, the control unit 1304c selects the method of the image restoration based on the number of the dip regions of the modulation transfer function. More preferably, the control unit 1304c controls the image restoration unit 1304d not to perform the image restoration when the number of the dip regions is greater than or equal to a predetermined number. On the other hand, the control unit 1304c controls the image restoration unit 1304d to perform the image restoration when the number of the dip regions is less than the predetermined number.

Preferably, the control unit 1304c selects the method of the image restoration based on a value $MTF_{DIP}$ (MTF value) of the dip region. Preferably, the control unit 1304c selects the method of the image restoration based on a position and a value of a dip region having a lowest frequency of the dip regions. More preferably, the control unit 1304c controls the image restoration unit 1304d to perform the image restoration by using the first optical transfer function when the value of the dip region is not greater than a predetermined value. On the other hand, the control unit 1304c controls the image restoration unit 1304d to perform the image restoration by using the second optical transfer function when the value of the dip region is greater than the predetermined value. More preferably, the control unit 1304c controls the image restoration unit 1304d to perform the image restoration by using the first optical transfer function when $0 \leq MTF_{DIP} \leq 0.05$ is satisfied, where $MTF_{DIP}$ is the value of the dip region. On the other hand, the control unit 1304c controls the image restoration unit 1304d to perform the image restoration by using the second optical transfer function when $MTF_{DIP} > 0.05$ is satisfied.

Preferably, the shake information includes at least one of pieces of information on a shake locus, a maximum shake value, and an averaged shake coordinate. More preferably, the shake information includes information on a motion of an image blur correction unit (device to correct an image blur caused by a shake such as a hand shake) provided in an image pickup apparatus when shooting an image. Preferably, the determination unit 1304a determines the optical transfer function for each position in an image (each image height).

In the configuration of each embodiment, for an image containing a shake occurring at the time of shooting the image in addition to blurring caused by an image pickup apparatus, an appropriate method of image restoration can be determined considering both characteristics of the shake occurring at the time of shooting the image and the blurring caused by the image pickup apparatus. Thus, according to each embodiment, an image processing apparatus, an image pickup apparatus, an image processing method, and a non-transitory computer-readable storage medium that are capable of restoring a blurred image appropriately.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-117484, filed on Jun. 6, 2014, which is hereby incorporated by reference wherein in its entirety.

What is claimed is:

1. An image processing apparatus comprising:
one or more processors; and
a memory storing instructions, the one or more processors configured to execute the instructions, thereby causing the image processing apparatus to function as:
a determination unit configured to determine an optical transfer function based on shooting condition information;
an acquisition unit configured to acquire shake information corresponding to a shake;
a control unit configured to select a method of image restoration based on the optical transfer function and the shake information; and
an image restoration unit configured to perform the image restoration based on the selected method of the image restoration,
wherein the control unit selects the method of image restoration from among methods of image restoration that include a method to correct an image blur caused by the shake,
wherein the determination unit is configured to:
determine, as a first optical transfer function, the optical transfer function based on the shooting condition information, and
determine a second optical transfer function based on the first optical transfer function and the shake information, and
wherein the determination unit is configured to combine, with the first optical transfer function, frequency characteristics of a shake acquired based on the shake information to determine the second optical transfer function.

2. The image processing apparatus according to claim 1, wherein when the image restoration unit performs the image restoration, the control unit is configured to select, as the method of the image restoration, either one of performing the image restoration by using the first optical transfer function or by using the second optical transfer function.

3. The image processing apparatus according to claim 1, wherein the control unit is configured to select any one of performing the image restoration by using the first optical transfer function, performing the image restoration by using the second optical transfer function, or not performing the image restoration.

4. The image processing apparatus according to claim 1, wherein the control unit is configured to select the method of the image restoration based on a modulation transfer function that is an absolute value of the first or second optical transfer function.

5. The image processing apparatus according to claim 4, wherein the control unit is configured to select the method of the image restoration based on a dip region of the modulation transfer function.

6. The image processing apparatus according to claim 5, wherein the control unit is configured to select the method of the image restoration based on the number of the dip regions of the modulation transfer function.

7. The image processing apparatus according to claim 6, wherein the control unit is configured to:
control the image restoration unit not to perform the image restoration when the number of the dip regions is not less than a predetermined number, and
control the image restoration unit to perform the image restoration when the number of the dip regions is less than the predetermined number.

8. The image processing apparatus according to claim 5, wherein the control unit is configured to select the method of the image restoration based on a value of the dip region.

9. The image processing apparatus according to claim 8, wherein the control unit is configured to select the method of the image restoration based on a position and a value of a dip region having a lowest frequency of the dip regions.

10. The image processing apparatus according to claim 8, wherein the control unit is configured to:
control the image restoration unit to perform the image restoration by using the first optical transfer function when the value of the dip region is not greater than a predetermined value, and
control the image restoration unit to perform the image restoration by using the second optical transfer function when the value of the dip region is greater than the predetermined value.

11. The image processing apparatus according to claim 8, wherein the control unit is configured to:
control the image restoration unit to perform the image restoration by using the first optical transfer function when $0 \leq MTF_{DIP} \leq 0.05$ is satisfied, where $MTF_{DIP}$ is the value of the dip region, and
control the image restoration unit to perform the image restoration by using the second optical transfer function when $MTF_{DIP} > 0.05$ is satisfied.

12. The image processing apparatus according to claim 1, wherein the shake information includes at least one of pieces of information on a shake locus, a maximum shake value, and an averaged shake coordinate.

13. The image processing apparatus according to claim 12, wherein the shake information includes information on a motion of an image blur correction unit provided in an image pickup apparatus when shooting an image.

14. The image processing apparatus according to claim 1, wherein the determination unit is configured to determine the optical transfer function for each image height.

15. An image pickup apparatus comprising:
an image pickup device configured to photoelectrically convert an optical image formed via an image pickup optical system;
one or more processors; and
a memory storing instructions, the one or more processors configured to execute the instructions, thereby causing the image processing apparatus to function as:
a determination unit configured to determine an optical transfer function based on shooting condition information;
an acquisition unit configured to acquire shake information corresponding to a shake;
a control unit configured to select a method of image restoration based on the optical transfer function and the shake information; and
an image restoration unit configured to perform the image restoration based on the selected method of the image restoration,
wherein the control unit selects the method of image restoration from among methods of image restoration that include a method to correct an image blur caused by the shake,
wherein the determination unit is configured to:
determine, as a first optical transfer function, the optical transfer function based on the shooting condition information, and
determine a second optical transfer function based on the first optical transfer function and the shake information, and
wherein the determination unit is configured to combine, with the first optical transfer function, frequency characteristics of a shake acquired based on the shake information to determine the second optical transfer function.

16. An image processing method comprising the steps of:
determining an optical transfer function based on shooting condition information;
acquiring shake information corresponding to a shake;
selecting a method of image restoration based on the optical transfer function and the shake information; and
performing the image restoration based on the selected method of the image restoration,
wherein the method of image restoration is selected from among methods of image restoration that include a method to correct an image blur caused by the shake,
wherein the determining step:
determines, as a first optical transfer function, the optical transfer function based on the shooting condition information, and
determines a second optical transfer function based on the first optical transfer function and the shake information, and
wherein the determining step combines, with the first optical transfer function, frequency characteristics of a shake acquired based on the shake information to determine the second optical transfer function.

17. A non-transitory computer-readable storage medium storing an image processing program to cause a computer to execute a process comprising the steps of:
determining an optical transfer function based on shooting condition information;
acquiring shake information corresponding to a shake;
selecting a method of image restoration based on the optical transfer function and the shake information; and
performing the image restoration based on the selected method of the image restoration,
wherein the method of image restoration is selected from among methods of image restoration that include a method to correct an image blur caused by the shake,
wherein the determining step:
determines, as a first optical transfer function, the optical transfer function based on the shooting condition information, and
determines a second optical transfer function based on the first optical transfer function and the shake information, and
wherein the determining step combines, with the first optical transfer function, frequency characteristics of a shake acquired based on the shake information to determine the second optical transfer function.

* * * * *